April 22, 1930.　　　　F. H. MAYER　　　　1,755,328
SUSPENSION DISCONNECTING SWITCH AND MOUNTING THEREFOR
Filed Sept. 1, 1925　　　2 Sheets-Sheet 1
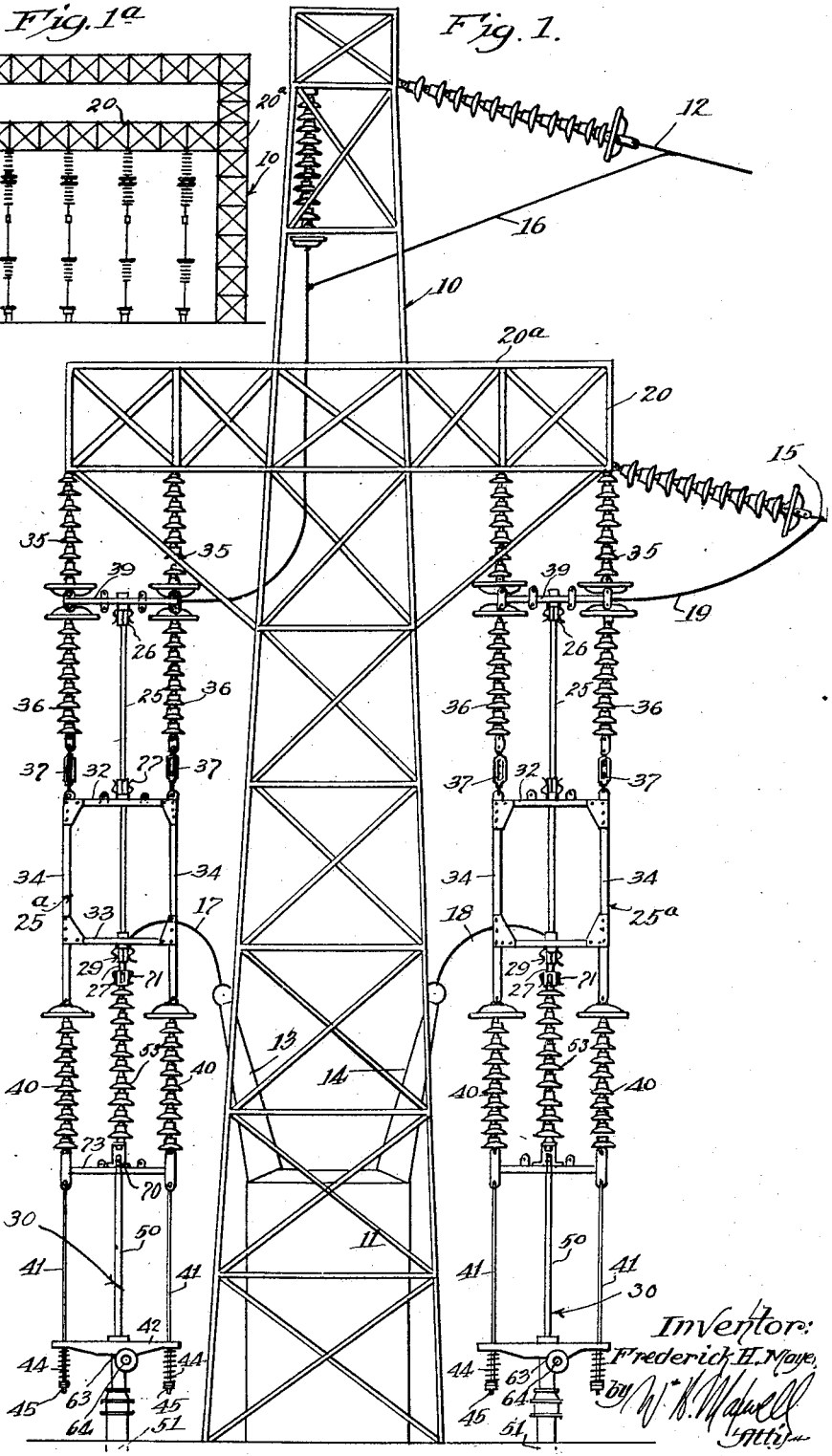

April 22, 1930.  F. H. MAYER  1,755,328
SUSPENSION DISCONNECTING SWITCH AND MOUNTING THEREFOR
Filed Sept. 1, 1925   2 Sheets-Sheet 2
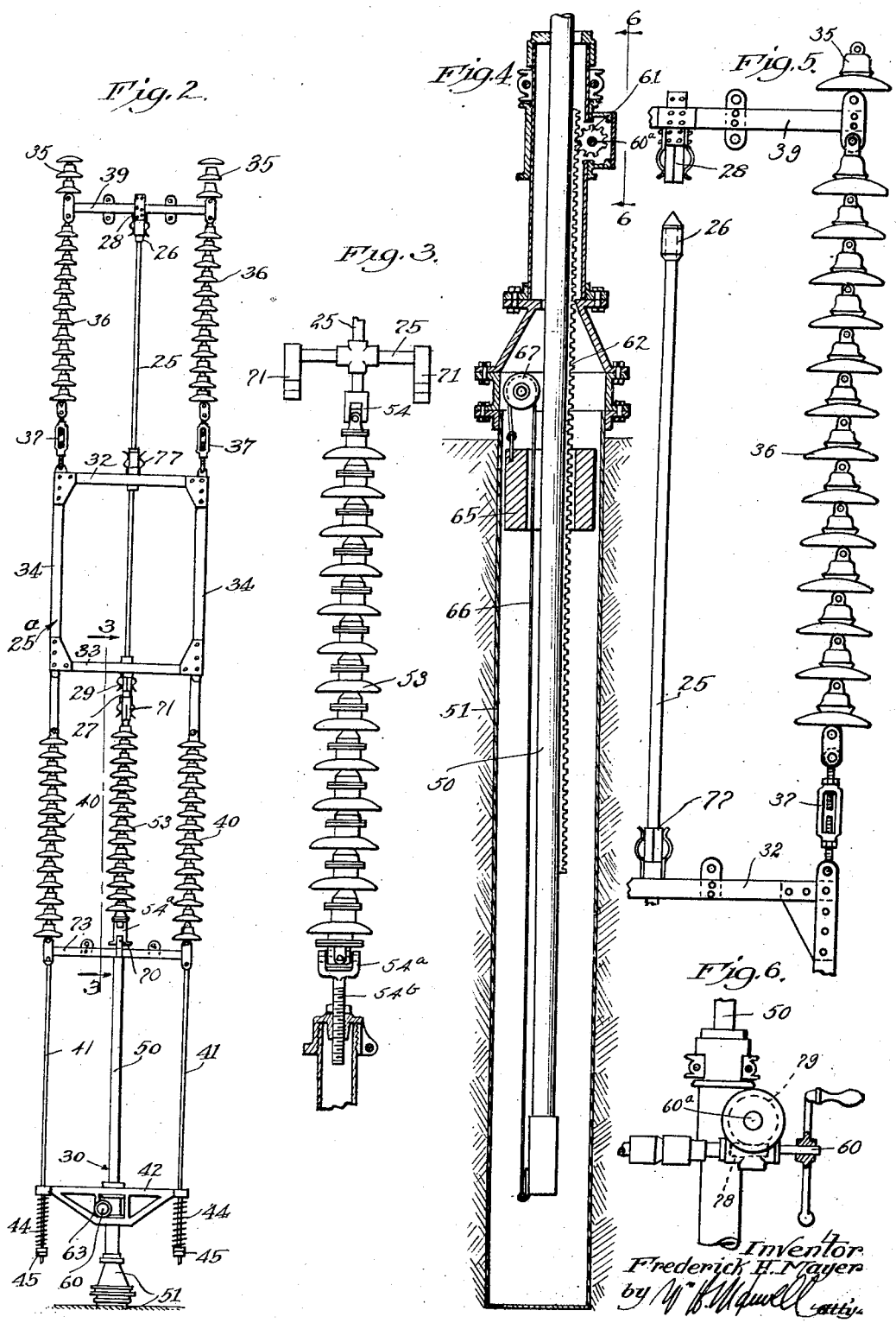

Patented Apr. 22, 1930

1,755,328

UNITED STATES PATENT OFFICE

FREDERICK H. MAYER, OF LOS ANGELES, CALIFORNIA

SUSPENSION DISCONNECTING SWITCH AND MOUNTING THEREFOR

Application filed September 1, 1925. Serial No. 53,835.

This invention has to do with an electric switch and mounting therefor. It is an object of the invention to provide a simple, effective and practical disconnecting switch for a high voltage line such as a power transmission line.

Disconnecting switches for high voltage power transmission lines usually embody a pivotally mounted blade and are constructed and mounted so that they are more or less cumbersome and occupy considerable space.

It is an object of this invention to provide a switch for the character of work mentioned in which the blade reciprocates and is arranged vertically making a switch that occupies comparatively small land area.

Another object of this invention is to provide in combination a line supporting tower and switch, wherein the switch is suspended from the tower.

It is another object of this invention to provide a combination switch and tower in which one end of the switch is held by the tower, and the other end of the switch is anchored to the ground.

A further object of the invention is to provide various novel and effective details of construction and arrangement such for instance; the adjustability of the various parts, the manner in which the parts are related and connected together, and in the various mechanical devices embodied in the device, etc.

The various objects and features of the invention will be best and more fully understood from the following detailed description of a typical form and application of the invention. Throughout which description reference is made to the accompanying drawings, in which:

Fig. 1 is a view showing a line supporting tower, a circuit breaker at the base of the tower and disconnect switches embodying the present invention controlling the connection between the line carried to the tower and the circuit breaker.

Fig. 1A is a diagrammatic side elevation of the tower.

Fig. 2 is an enlarged view of a portion of the switch showing it in a closed position.

Fig. 3 is an enlarged view of certain parts shown in Fig. 2, being a view taken as indicated by line 3—3 on Fig. 2.

Fig. 4 is an enlarged detailed sectional view of the lower portion of the operating mechanism.

Fig. 5 is an enlarged view of a portion of the switch showing the switch partially opened.

Fig. 6 is a view taken as indicated by line 6—6 on Fig. 4.

This invention is directed, generally, to a switch for handling high voltage electric currents and particularly for controlling high voltage power transmission lines. The invention is capable of embodiment in various forms and may be used in various situations. I have in the present disclosure set forth only one typical form and application of the invention because it is believed that this will make clear the nature and principles of the invention.

In the drawings, particularly Fig. 1, I illustrate a tower 10 for supporting a high tension, or power transmission line, the particular tower illustrated being a dead end tower. I have shown an oil circuit breaker 11 at the base of the tower, and have shown two switches embodying the present invention carried by the tower, one controlling the connection between the line 12, carried by the tower, and one terminal 13 of the circuit breaker, and the other controlling the connection between the other terminal 14 of the circuit breaker and the lead line 15 which leaves the tower. In the particular arrangement shown in the drawings one side or pole of the first mentioned switch is connected with the line 12 by a suitable jumper loop or connection 16, and the other side or pole of the switch is connected with the terminal 13, by a similar connection 17. The terminal 14 of the circuit breaker is connected with one pole of the second switch by a connection 18, and the other pole of the second switch is connected with the lead line 15 by a jumper loop or connection 19.

The steel tower 10, shown in the drawings is one of the general type employed in this class of work. The tower may be extended to accommodate as many switches as required. These switches may be alike in construction and operation. The switches are located at the sides of the tower and in a case where several switches are to be arranged at a single side of the tower, the tower may be provided at each end and near the top with horizontal arms or brackets that extend from opposite sides of the tower. To these brackets 20ª are fixed horizontal box girders 20. The switches are then suspended from these girders at proper intervals on both sides of the tower. This general construction is shown on Fig. 1A.

I will proceed to describe in detail one switch, it being understood that such description is applicable to both switches, and that the switches may be connected up or employed in manners other than are herein set forth.

The switch includes, generally, a movable blade 25, two main contacts 26, and 27, arranged at or carried by the upper and lower ends respectively, of the blade, two stationary contact clips 28 and 29 adapted to receive the contacts 26 and 27, respectively, when the switch is closed, operating means 30 for the blade 25, and a supporting construction whereby the switch is supported between box girder 20 of the tower and the ground.

The blade is in the form of a comparatively long bar or rod, preferably a pipe or tube, and is supported in a vertical position so that it can be reciprocated vertically. The support for the blade is a frame like structure 25ª, including two spaced horizontal cross bars 32 and 33 and two vertical connecting bars 34 which join the ends of the cross bars. The cross bars 32 and 33 slidably carry the blade 25 and are spaced a substantial distance apart as shown in the drawings so that they effectively support the blade in a vertical position.

The upper stationary contact clip 28 is mounted in vertical alignment with the blade 25, at a point to receive the contact 26 on the upper end of the blade when the blade is in the up position. The conductor 16 leading to the switch is connected to the clip 28. The contact clip 28 may be carried or supported in any suitable manner. In accordance with the preferred construction the clip is carried by a cross bar 39 suspended from the box girder 20 of the tower through suitable insulating means. In the drawings I have shown two strings of insulators 35 extending downwardly from the box girder and connecting with the ends of the cross bar 39. The supporting frame 25ª for the blade 25 may be suspended from the cross bar 39 or through the strings of insulators 35. I have shown in the drawings two strings of insulators 36 extending downwardly from the ends of the cross bar 39 and connected with the ends of the top cross bar 32 of the blade carrying frame. In accordance with my invention the connection between the clip supporting bar 39 and blade carrying frame, includes means for adjustment between these parts. This means may be in the form of turn buckles 37 at the ends of the strings of insulators 36. In the drawings, I have illustrated a turn buckle 37 between the lower end of each string of insulators 36 and the blade carrying frame.

The blade carrying or guiding frame 25ª is connected or anchored to the ground by suitable means, for instance, by strings of insulators 40, extending downwardly from the ends of the lower cross bar 33 of the frame, and anchor rods 41 which connect the strings of insulators with a stationary cross head 42 at the ground.

Suitable resiliency is provided in the construction between the box girder of the tower and the ground to equalize, or allow for, certain strains that may be set up in the structure due to temperature, wind, etc. This means is preferably in the form of resilient connections and in practice may be in the form of springs 44 suitably arranged at the connection between the anchor rod 41 and stationary cross head 42. In the drawings I have shown the anchor rods extending downwardly through the ends of the cross head 42 and I have shown the compression springs 44 arranged between the lower side of the head 42 and nuts 45 screw threaded on the lower ends of the rods. With this construction the tension under which the entire structure is held may be adjusted by operation of the nuts 45. The lower contact clip 29 which is adapted to cooperate with the contact 27 at the lower end of the blade and to be connected with the other conductor leading to the switch may be mounted on or carried by the lower cross bar 33 of the blade carrying frame 25ª. The parts are arranged and related so that the contacts 26 and 27 on the blade are in co-operative engagement with the clips 28 and 29, respectively, when the blade is in the up or closed position. When the blade is down or in open position, the contacts on the blade are far removed from the clips, the contact 26 being at or close to the cross bar 32 of the blade carrying frame so that there is a wide gap between the stationary clip 28 and the blade 25.

The operating means provided by my invention act to operate or reciprocate the blade 25 between the two positions just mentioned. The operating means illustrated in the drawings includes a plunger 50 which operates in, and projects from the upper end of, a housing 51 mounted stationary in the ground. The plunger is operatively connected with and insulated from the switch blade 25 by suitable means; for instance by a column of insulators 53. The column of insulators is constructed so as to be rigid and the connections between the insulators and the switch blade and plunger are made through upper and lower universal joints 54 and 54ª. The lower universal joint 54ª is adjustable, through a screw 54ᵇ allowing a vertical take up which compensates for any settling of the tower. The housing 51 is in the form of a cylindrical case and is permanently embedded in the ground. The upper end of the housing which projects above the surface of the ground carries the cross head 42. The plunger is adapted to be reciprocated or moved up and down by suitable gear means. This includes an operating shaft 60 which extends into the upper part of the housing. On the operating shaft a worm 78 is mounted to operate a worm wheel 79 on shaft 60ª located at right angles to the shaft 60. A pinion 61 is mounted on the other end of the shaft 60ª to mesh with a rack 62 mounted longitudinally on the plunger. The operating shaft may be provided with a hand wheel, a motor, or may be hydraulically operated, and in practice may be extended to any desired point removed from the switch, and may extend between several switches so that they operate together.

In accordance with my invention I provide the movable part of the switch with a counter balance so that it is easy to operate and will not move unless operated. The counter balance may be in the form of a weight 65 carried in the housing around the plunger. A flexible cable 66 connects the lower end of the plunger and weight and extends over a pulley 67 in the upper end portion of the housing. With this arrangement the weight and plunger move in opposite directions when the device is operated, one counterbalancing the other.

In accordance with my invention I provide grounding means operable to ground the switch when it is open and which can be included in the disconnecting switch if desired. This grounding means includes stationary contact 70 and contact clips 71 movable with the blade to cooperate with the contacts 70 when the blade is down or in open position. The contacts 70 may be mounted stationary on a cross bar 73 carried between the upper ends of the anchoring rods. The contact clips 71 may be mounted at the lower end of the switch blade 25 on projections or arms 75, extending from the blade. With this construction the blade 25 is effectively connected electrically with the parts of the switch connected with the ground when the blade is open or in the down position. In order that the blade carrying frame and other parts above the insulators 40 may be effectively grounded I provide a contact clip 77 on the top cross bar of the frame to receive the contact 26 when the blade is down.

From the foregoing description it is believed that the operation of the switch will be readily understood. When the blade 25 is in the closed or up position, as shown in Fig. 1 and Fig. 2 of the drawings, electrical connection is made through the blade between the electrical connectors 16 and 17 or other parts connected with the contact clips 28 and 29. To open the switch the operating shaft 60 is rotated, to cause lowering of the plunger 50. Upon the plunger being lowered, the switch blade 25 moves to the down position where the grounding connections are in contact and the switch open. When the blade is in the down position there are no electrical connections between the upper contact clip 28 and parts in connection with the blade 25 and all of the parts electrically connected with blade 25 are effectively connected with the ground. This ground connection is highly desirable for protection to men who work on the disconnecting switch or parts connected with the switch when the switch is open.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A switch to be carried by a line supporting tower and having its upper end attached to the tower, and means attaching the other end of the switch to the ground independently of the tower, the switch including, two spaced contacts, means supporting the contacts so that they are insulated from each other and from the tower and the ground, a blade movable into and out of position where it connects the contacts, and means whereby one of the contacts is electrically connected with the ground independently of the tower when the blade is out of position where it connects the contacts.

2. A switch to be carried by a line supporting tower to extend from the upper part thereof to the ground including, two spaced contacts, means supporting the contacts so that they are insulated from each other and from the tower and the ground, a blade movable into and out of position where it connects the contacts, and means whereby one of the contacts is electrically connected with the ground independently of the tower when the blade is out of position where it connects the contacts, said means including a contact carried by a part of the switch electrically connected with the ground and in position to be engaged by the blade.

3. A switch to be carried by a tower to extend from the upper part of the tower to the ground including, an upper contact, a ground contact electrically connected with ground independently of the tower, a frame, strings of insulators supporting the frame between said contacts, a lower contact carried by the frame, and a blade carried by the frame movable vertically between a position where it connects the upper and lower contacts and a position where it connects the lower and ground contacts.

4. A switch to be carried by a tower to extend from the upper part of the tower to the ground including, an upper contact, a ground contact electrically connected with ground independently of the tower, a frame, strings of insulators supporting the frame between said contacts, a lower contact carried by the frame, a blade carried by the frame movable vertically between a position where it connects the upper and lower contacts and a position where it connects the lower and ground contacts, and means for operating the blade from the ground including a string of insulators insulating the blade from the ground.

5. A switch to be carried by a tower to extend from the upper part of the tower to the ground including, an upper contact, a ground contact electrically connected with ground independently of the tower, a frame, strings of insulators supporting the frame between said contacts, a lower contact carried by the frame, a blade carried by the frame movable vertically between a position where it connects the upper and lower contacts and a position where it connects the lower and ground contacts, and means for operating the blade from the ground including, a plunger mounted at the ground, means for moving the plunger vertically, and a string of insulators connecting the plunger and blade.

6. A switch to be carried by a tower to extend from the upper part thereof to the ground including, two spaced contacts, a blade operable vertically to connect the contacts, and operating means for the blade including, a plunger at the ground, a string of insulators connecting the blade and plunger, a counter balance connected with the plunger, and a mechanism at the ground for operating the plunger.

7. A switch to be carried by a tower to extend from the upper part thereof to the ground including, two spaced contacts, a blade operable vertically to connect the contacts, and operating means for the blade including, a casing extending into the ground, a plunger operable in the casing and projecting upwardly therefrom, a string of insulators connecting the plunger and blade, a counterweight in the casing connected with the plunger, and and a rack mechanism for operating the plunger.

8. A switch to be carried by a tower to be connected between the upper part of the tower and the ground including, an upper contact, a ground contact electrically connected to the ground independently of the tower, a frame, insulators supporting the frame between said contacts, a lower contact carried by the frame, a blade slidably carried by the frame, and means for operating the blade vertically between a position where it connects the upper and lower contacts and a position where it connects the lower and ground contacts, said means including, a plunger mounted at the ground, means for operating the plunger, and insulators connecting the plunger and the blade.

9. A switch to be carried by a tower to be connected between the tower and the ground including, two spaced contacts, means supporting the contacts so that they are insulated from the ground and from the tower, said means including, spaced anchor rods holding the lower end of the switch and a cross arm carried between the anchor rods, a ground contact mounted on said cross arm, a blade movable between a position where it connects the two spaced contacts and a position where it connects one of the spaced contacts and the ground contact, and means for operating the blade between these positions.

10. A switch to be carried by a tower to be connected between part of the tower and the ground including, an upper contact insulated from the tower by insulators, an anchor rod, a frame carried between the insulators and the anchor rod, a lower contact on the frame, an arm carried by the anchor rod, a ground contact mounted on the arm, and a blade movable between a position where it connects the upper and lower contacts and a position where it connects the lower and ground contacts.

11. A switch to be carried by a tower to be connected between a part of the tower and the ground including, a cross arm, insulators carrying the cross arm, an upper contact mounted on the cross arm, the said insulators being connected to a part of the tower, a frame, insulators extending from the cross arm and carrying the frame, the frame having an upper bar and a lower bar, a lower contact mounted on the lower bar, an anchor rod, insulators connecting the lower bar with the anchor rods, an arm carried by the anchor rod, a ground contact on the last mentioned arm, a blade operable between a position where it connects the upper and lower contacts and a position where it connects the lower and ground contacts, and means to operate the blade including a plunger on the ground connected to the blade by insulators.

12. A switch to be carried by a tower to be connected between a part of the tower and the ground including, two spaced strings of insulators extending downward from a part of the tower, a cross arm carried between the strings of insulators, an upper contact on the said cross arm, a frame supported by the strings of insulators, the frame having upper and lower bars, a lower contact mounted on the lower bar, anchor rods, a string of insulators extending downward from each end of the lower bar of the frame connected to the anchor rods, a cross arm carried between the anchor rods, a ground contact mounted on the last mentioned cross arm, a blade operable to move between a position where it connects the upper and lower contacts and a position where it connects the lower and ground contacts, and means for operating the blade between these positions, said means including, a counterbalanced plunger on the ground and a gear and rack mechanism to operate the plunger.

13. A switch to be carried by a tower to be connected between a part of the tower and the ground including, two spaced strings of insulators extending downward from the tower, a cross arm carried between the strings of insulators, an upper contact on the cross arm, a frame connected to the ends of the spaced strings of insulators, the frame having an upper bar and a lower bar, a contact on the upper bar, a contact on the lower bar, spaced anchor rods, a string of insulators extending downward from each end of the lower bar of the frame and connected to the anchor rods, a cross arm carried between the said anchor rods, a ground contact on the last mentioned cross arm, a blade operable between a position where it connects the upper contact and the contact on the lower rod of the frame and a position where it connects the contacts on the upper and lower rods of the frame and the ground contact, and means for operating the blade between these positions, said means including a counterbalanced plunger on the ground and a gear mechanism to operate the plunger.

In witness that I claim the foregoing I have hereunto subscribed my name this 21st day of August, 1925.

FREDERICK H. MAYER.